Aug. 18, 1959  L. B. LYNN  2,899,828
STABILIZING APPARATUS
Filed Oct. 18, 1955  5 Sheets-Sheet 1

WITNESSES
Edwin E. Bassler
Wm. B. Sellers.

INVENTOR
Lawrence B. Lynn
BY
Hymen Diamond
ATTORNEY

Fig. 5.

Aug. 18, 1959 L. B. LYNN 2,899,828
STABILIZING APPARATUS
Filed Oct. 18, 1955 5 Sheets-Sheet 4

Fig. 17.

United States Patent Office 2,899,828
Patented Aug. 18, 1959

2,899,828

STABILIZING APPARATUS

Lawrence B. Lynn, Wilkinsburg, Pa., assignor to Westinghouse Electric Corporation, East Pittsburgh, Pa., a corporation of Pennsylvania Application October 18, 1955, Serial No. 541,279

13 Claims. (Cl. 74—5.5)

This invention relates to apparatus for controlling the movement of movable systems and has particular relation to apparatus for effecting such control in response to velocity and displacement changes of the systems. Such control apparatus is particularly useful in stabilizing the angular position of the turret of a tank or the elevation of its guns or the position of an air or surface craft and its guns.

Control apparatus includes as a sensing element a gyro unit for each axis of control. Each unit is mounted on the system to be controlled in such manner that it precesses in response to the movement of the system about the axis or is caused to precess when movement of the system about the axis is required. The precession is manifested in the form of a torque about the precession axis, the magnitude of which is determined or determines the movement of the system. The gyro unit is connected through precession responsive means such as an amplifier which when the gyro unit precesses responds to its torque to transmit a signal to correcting means such as an actuator. The latter impresses a control impulse on the movable system to control the movement of the system. The movement which produces the precession is usually referred to as the error velocity or error displacement, depending on whether it is one or the other.

High performance control apparatus requires that error signals corresponding both to the velocity and to the displacement be supplied or fed back from the sensing unit to the correcting unit or the actuator since low frequency (low velocity) response is poor with velocity signals alone, and high positional precision cannot be attained with only displacement signals. Because the actuator fails to respond to very low velocities, the system controlled, if subject only to velocity response, could be displaced substantially without any correction at low velocities in the absence of positional response. A system subject to the high sensitivity positional response demanded is unstable (tends to hunt) in the absence of velocity response. A gyro unit having but a single axis of precessional motion impeded by a measured restraint is generally used because of its simplicity and non-tumbling characteristics. Either angular velocity or displacement errors may be measured by restrained gyro unit, depending upon the impedance characteristics of the restraint which may be compliant or resilient for velocity measurement or viscous for angle (integrated velocity) measurement. To achieve both velocity and angle sensing a gyro unit of each type could be used about an axis of control to supply the necessary velocity and angle error signals. But this has disadvantages and the practice in accordance with the teaching of the prior art is to use only one gyro unit having integrated-velocity (or displacement) response and to operate upon its output signal electrically, through an electrical differentiating network in an amplifier circuit to obtain velocity response in addition to the displacement response. The auxiliary differentiating network is basically a loss circuit that requires considerable additional gain and critical adjustment, and thus a complex and costly amplifier which is difficult to maintain is required.

It is accordingly broadly an object of this invention to provide high performance gyroscopic control apparatus of relatively simple structure.

Another broad object of this invention is to provide such control apparatus including as a sensing element for each axis of control only a single gyro wheel restrained (or constrained) so that it has a single axis of precession.

A further broad object of this invention is to provide such control apparatus including only a single restrained gyro wheel as a sensing element for each axis in the use of which control signals proportional both to velocity and displacement error signal shall be produced without the aid of electrical differentiation.

A specific but important object of this invention is to provide such control apparatus including for each axis only a single restrained gyro wheel in the use of which signals proportional to both the velocity and displacement shall be produced mechanically.

Another specific object of this invention is to provide a gyro unit which shall be capable of producing both velocity and displacement signals.

An ancillary object of this invention is to provide a novel command signal unit for causing a gyro unit to precess when a system is to be moved.

This invention in its broader aspects arises from the realization that the gyro wheel, the sensing element, when it is restrained so that it precesses about a single axis, and further resiliently restrained so that it responds to error velocities, in itself responds to error velocities which are substantially smaller than the error velocity to which the system as a whole is able to respond. A threshold error velocity, which may be defined as the error velocity for which the control apparatus as a whole responds, exists for any stabilizing system. For apparatus in accordance with the teachings of the prior art, this threshold error velocity is a velocity just sufficient to overcome the impeding effects not only of the sensing element but also of the correcting means so that the correcting means and the movable system respond to counteract this threshold error velocity. But this threshold error velocity is substantially larger than the threshold error velocity of the sensing element alone so that the sensing element usually produces a precessing torque for substantially lower velocities than those which result in correction.

In this invention in its broadest aspects, advantage is taken of the response of the sensing element or the gyro unit to low error velocities by integrating the effects of the low error velocities. The integration may take place quasi mechanically with the aid of an integrating capacitor or entirely mechanically. Of the two, the latter is the more important and will now be discussed.

In accordance with this important specific aspect of this invention, a gyro unit is provided which includes a gyro wheel restrained so that it has a single axis of precession and further restrained about this axis, the latter restraint including mechanically in series a resilient restraint and a damping, and specifically a viscous, restraint. A viscous restraint is proportional to velocity. The resilient restraint provides an error signal depending on velocity and the damping restraint an error signal depending on displacement or integrated velocity. In a system of this type, signals of three different types may be derived proportional to the relative movements of the components. (1) The movement relative to the base of the gyro wheel itself or any component rigidly secured to the gyro wheel is proportional to the sum of the input velocity plus the input displacement; (2) the movement of the gyro wheel relative to the intermediate component resiliently coupled to the wheel and coupled to the base through damping is proportional to the input velocity; and (3) the movement relative to the base of the intermediate component is proportional to the input displacement (integrated input velocity). It is desirable that the integrating-component time-constant of this gyro unit be long compared to the time constant of the actuator, and the latter time constant may itself be relatively large.

It is of interest to consider the magnitude of the integrating damping or resistance which is required in a practical situation. Consider then, a rotating system, and let T be the torque of a resiliently and viscous restrained gyro unit produced in response to an angular velocity $w$ of the system, then $$T = Gw$$

where G is the constant of the gyro. Assume that for an input velocity $w_1$, it is desirable that the angular displacement of the gyro be $\theta_1$, then the stiffness $k$ of the restraining spring is given by:

$$k = \frac{T_1}{\theta_1}$$

or $$k = \frac{Gw_1}{\theta_1}$$

The integrated gyro time constant $t$ is defined as the ratio of the damping factor R to the stiffness. Thus $$t = \frac{R}{k} = \frac{\theta_1 R}{Gw_1}$$

Now in a practical situation the gyro may have a spin momentum such that $G = .05$ lb. inches per radian per second, and the sensitivity required may be .02 radians for an input velocity of .02 radians per second. $k$ then is given by $$k = \frac{.05 \times .02}{.02} = .05 \text{ lb. inches}$$

per radian. A gyro time constant of the order of 10 seconds may be required in many situations. The damping factor for such a time constant may then be given by $R = .05 \times 10$ or .5 lb. inches per radian per second. Damping of this magnitude is relatively high and it is a specific object of this invention to provide a gyro unit which shall include high integrating damping facilities.

In accordance with this aspect of this invention a gyro unit is provided which includes a gyro wheel restrained so that it has a single axis of precession and a pair of shells or sleeves of such dimensions that one shell may be disposed within the other. The gyro wheel and its restraint member are resiliently connected to the inner shell with the axis of precession coaxial with an axis of symmetry of the inner shell. The inner shell is suspended within the outer shell from suitable anti-friction bearings or resiliently, and a damping fluid medium, for example a heavy oil, is provided between the inner shell and the outer shell. The spacing between the inner shell and the outer shell may be relatively small so that the damping effect of the fluid medium is high. In addition, the components in the fluid should be so dimensioned with respect to the specific gravity of that fluid that the gyro wheel and its restraint has a buoyancy counteracting the gravity effect of the wheel and the restraint on the supports or bearings. Such counteraction takes effect whether the axis is vertical, horizontal or at an angle to the vertical. In this unit the resilient connection between the wheel and the inner shell is in series with the damping connection.

The novel features characteristic of this invention are discussed generally above. The invention itself, both as to its organization and its method of operation together with additional objects and advantages thereof, will be understood from the following description of specific embodiments when read in connection with the accompanying drawings, in which.

Figure 1:
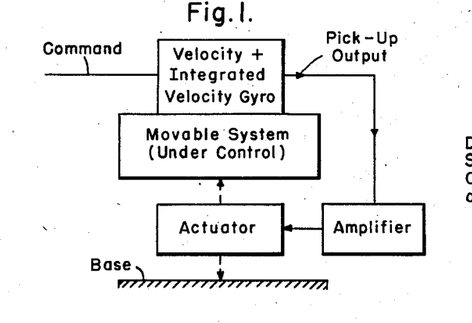
Figure 1 is a block diagram of control apparatus in accordance with this invention.

The apparatus shown in Fig. 1 includes a movable system under control such as the turret or gun of a tank. A gyro unit in accordance with this invention is mounted on the system with its precession axis so disposed that precession about this axis takes place for movement of the system about one of its axes. The gyro unit is provided with facilities for producing both velocity dependent and integrated velocity or displacement dependent signal, and includes a pick-up which is connected usually through an amplifier to an actuator. The actuator reacts with the movable system to correct for any changes in velocity or displacement detected by the gyro unit. In addition, provisions are made for impressing on the gyro unit a command signal when it is desirable that the system move in a predetermined direction. The impressing of the command signal causes precession torque to develop in the gyro unit which is transmitted through the amplifier to the actuator, in turn producing movement of the movable system at a rate and to an extent determined by the command signal.

Figure 2:
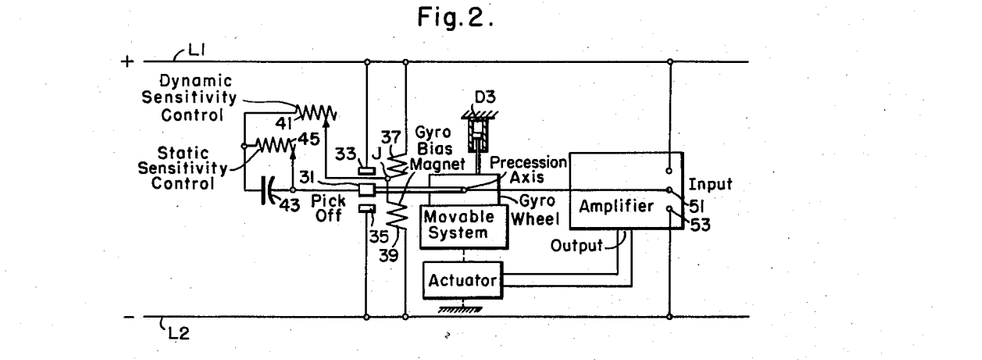
Fig. 2 is a diagrammatic view showing quasi mechanical control apparatus in accordance with an aspect of this invention.

*Description—Fig. 2*

In accordance with one of the specific aspects of this invention, the desired response of the sensing element may be achieved by electrical integration. This approach to the problem is to be preferred over the prior art approach of differentiating an integrated response as being simpler. The integrating system is shown diagrammatically in Fig. 2. It is supplied from conductors L1 and L2 of a direct current supply and includes a gyro wheel mounted on a movable system. The gyro wheel is restrained so that it has a single precession axis. The gyro wheel is further restrained about its precessional axis by a mechanical damping resistance D3 to suppress mechanical resonance and by the compliance of a pick-off. The pick-off includes a movable contact 31 which is connected to the precession axis and is moved as the wheel precesses and fixed contacts 33 or 35 which movable contact 31 is capable of engaging depending on the direction of precession. When the wheel precesses, there is a vibratory engagement of the movable contact 31 with either of the fixed contacts 33 or 35 which in the absence of other external components produce a signal proportional to the precession torque.

The gyro unit includes a pair of biasing magnetic coils 37 and 39, one disposed so that when energized it opposes precession in one direction and the other so that when energized it opposes precession in the other direction.

In the presence of an input velocity the coils 37 and 39 impress a negative feedback torque about the precession axis of the gyro, adding a ringing circuit effect to the above described vibration. The effect of this negative feedback is to decrease the sensitivity of the velocity response of the gyro. The coils 37 and 39 are connected in series across the supply conductors L1 and L2 and their junction J is connected through a variable resistor 41 and a capacitor 43 to the movable contact 31. The capacitor 43 may be shunted by a variable resistor 45.

In the presence of an input velocity the contact 31 vibrates in and out of engagement with the contacts 33 or 35. A charging pulse flows to the capacitor on each engagement of the contacts 31—33 or 31—35 and the capacitor integrates the pulses to build up a potential in opposition to the negative feedback potential. The resulting negative feedback current is proportional to the difference between the negative feedback potential and the capacitor potential. The negative feedback current is thus reduced in direct dependence upon the time integral of the input velocity. The series variable resistor serves to provide the dynamic sensitivity control for the apparatus and the parallel resistor the static sensitivity control. The resulting signal which is proportional to input velocity plus integrated input velocity is then impressed on the input of an amplifier which may be of the push-pull type. Thus when the precession is such that contacts 33 and 31 are engaged, the resulting signal flows in a circuit from conductor L1 through contacts 31—33, input terminals 51—53 of the amplifier to L2.

*Operation—Fig. 2*

In describing the operation it may be assumed that the movable system moves in such manner as to cause the gyro wheel to precess. The precession causes the movable contact 31 to engage one of the fixed contacts 33 or 35. Assume that the upper fixed contact 33 is engaged. Under such circumstances, current flows from the conductor L1 through the upper and movable contacts 33 and 31, between the lower input terminals 51 and 53 of the amplifier and a signal is transmitted to the actuator which impresses a correcting effect. The character of the signal thus transmitted is determined by the gyro and pick-off circuit characteristics as modified by the integrating circuit 41—43—45. In this circuit current flows from the conductor L1 through the upper and movable contacts 33 and 31, the capacitor 43, the dynamic sensitivity resistor 41, the lower magnet coil 39 to conductor L2. This current charges capacitor 43 with the plate shown at the right hand positive and the plate shown at the left hand negative and energizes the magnet coil 39 so that it exerts a force to restore the gyro wheel to its initial condition, causing disengagement of the movable contact 31 from the upper fixed contact 33. The voltage across the capacitor 43 is proportional to the integral of the impressed current. Responsive to a signal producing precession and effective over an appreciable time interval, the input of the amplifier is thus supplied with a signal depending on the velocity which produces the precession plus the displacement which accompanies the precession, the displacement component being derived from capacitor 43. The net effect is that the actuator receives a signal depending not only on the velocity but also on the displacement of the movable system. In situations in which the velocity is substantial, a correcting effect is produced through the amplifier which operates instantaneously. Where the velocity is so small that it causes the gyro wheel to precess without causing the actuator to function, the small signal is integrated so that if the velocity persists for any substantial time interval an integrated signal is built up producing correcting operation of the actuator. After the velocity of the system has stopped the discharge of the integrating capacitor 43 tends to reduce the residual error of the system.

Figures 14, 15, 16:
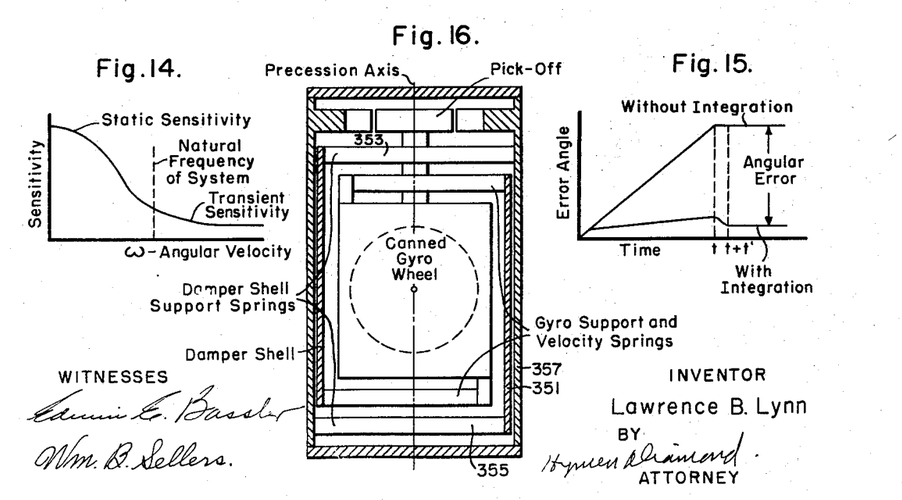
Fig. 14 is a graph illustrating one aspect of the operation of this invention.
Fig. 15 is a graph illustrating another aspect of the operation of this invention.
Fig. 16 is a view in transverse section of a modification of this invention.

The manner of operation of the apparatus shown in Fig. 2, assuming that the movable system is undergoing cyclic motion, is illustrated in Figs. 14 and 15. Fig. 14 is a graph in which sensitivity is plotted as a function of the angular frequency $w$. It is seen that the sensitivity of the system is a maximum for low frequencies and decreases so that it is small for high frequencies, the small sensitivity being of such magnitude as to be consistent with the dynamic requirements of the system. It is preferred that the time constant of the integrating circuits should be such that the sensitivity is low for the frequencies in the region corresponding to the natural frequency of the system.

In Fig. 15 the error angle accumulated for movement of the system is plotted as a function of time, the upper curve corresponding to a system in which there is only velocity response of the sensing element and the lower curve corresponding to a system in which there is both velocity and displacement response. The velocity of the moving system is assumed to be terminated at the instant $t$. It is seen that in the system having the composite sensing the accumulated error is small at time $t$ and is further reduced by the discharge of the capacitor 43 when the velocity impressed on the system is terminated.

Figure 3:
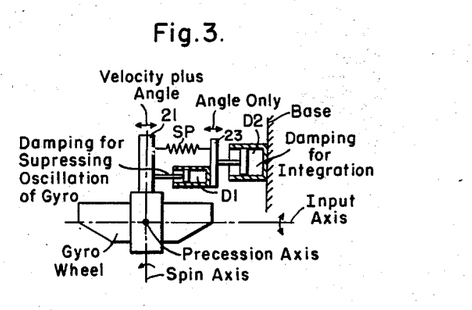
Fig. 3 is a diagram of a gyro unit in accordance with this invention.

A purely mechanical gyro unit in accordance with an important aspect of this invention is shown schematically in Fig. 3. This unit includes a gyro wheel so restricted that it has a precession axis perpendicular to the plane of the drawing. The precession of the wheel about this axis is further restricted by a spring SP which is connected between an arm 21 extending from the gyro wheel movable as the wheel precesses and an arm or vane 23. To suppress mechanical resonance in the movement of the wheel itself, a dampening mechanism D1 is provided in parallel with the spring SP. In addition, there is a dampening mechanism D2 between the spring and the base that is mechanically in series with the spring.

When an input velocity is applied a precessional torque proportional to the input velocity is developed by the gyro wheel and it precesses through an angle proportional to the input velocity and a time integral of the velocity. The vane 23 moves and the movement of the vane is proportional to the time integral of the velocity alone. The displacement measured is dependent on the dampening mechanism D2. A pick-off measuring the movement of the wheel or the arm 21 extending from the wheel relative to the base thus produces a signal proportional to the input velocity plus the input displacement. A pick-off measuring the movement of the vane 23 relative to the base produces a signal proportional to the input displacement alone. A pick-off measuring the movement of the wheel relative to the vane 23 produces a signal proportional to input velocity alone. Specifically, the velocity is an angular velocity and the displacement is an angular displacement.

*Description—Figs. 4 through 13*

In Figs. 4 through 13 a gyro unit in accordance with the preferred practice of this invention is disclosed. This unit includes a gyro wheel 61 (Fig. 11) rigidly mounted between end bearings 63 in a can or container 65. The can 65 has a circularly cylindrical wall 67 hermetically closed by bases 69. The axis 71 of the wall 67 is perpendicular to the axis of rotation 73 of the wheel 61.

Figures 4, 10, 11:
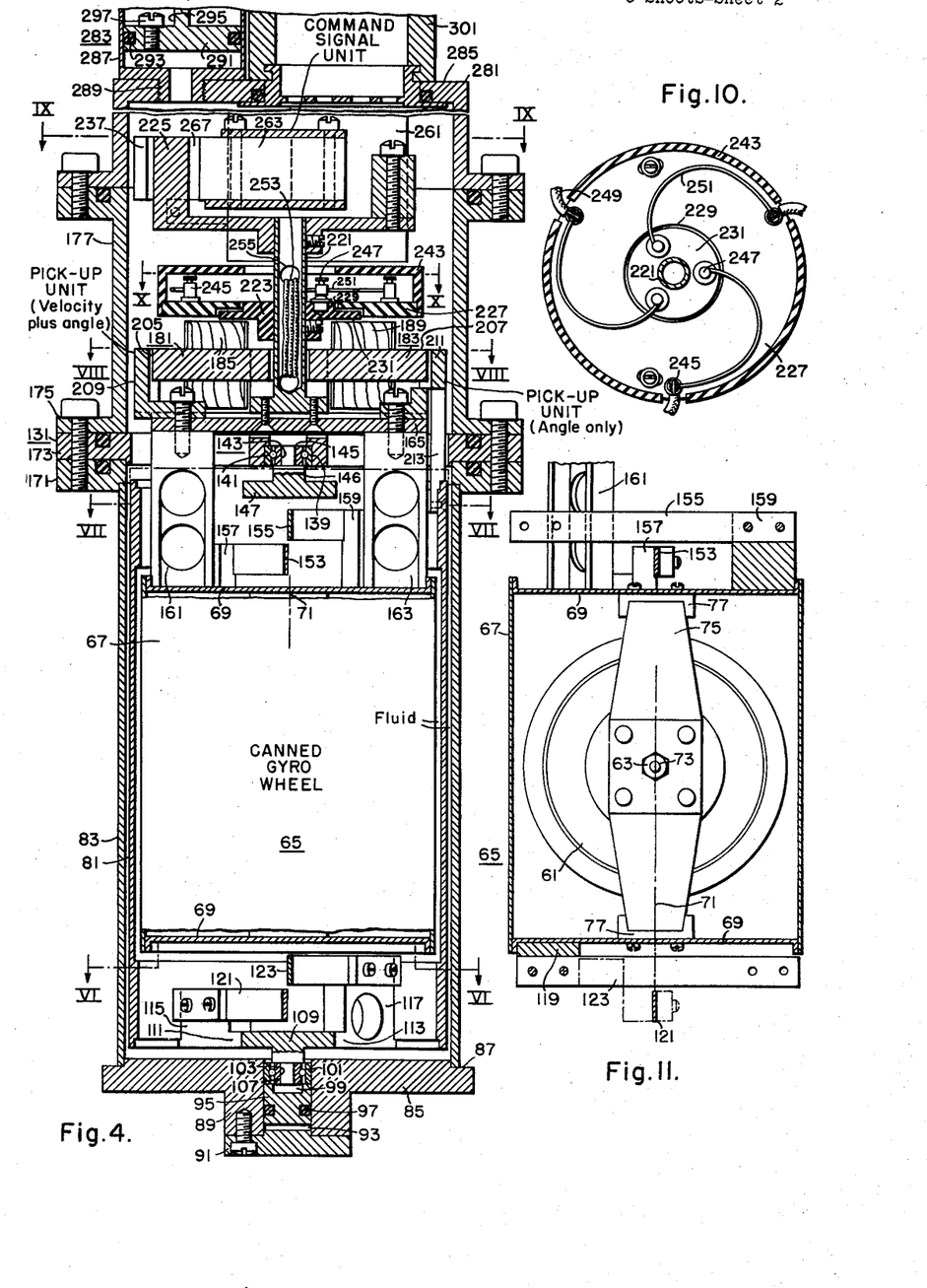
Fig. 4 is a view in longitudinal section of a preferred embodiment of this invention.
Fig. 10 is a view in transverse section taken along line X—X of Fig. 4.
Fig. 11 is a view in longitudinal section taken along line XI—XI of Fig. 7.
Figure 5:
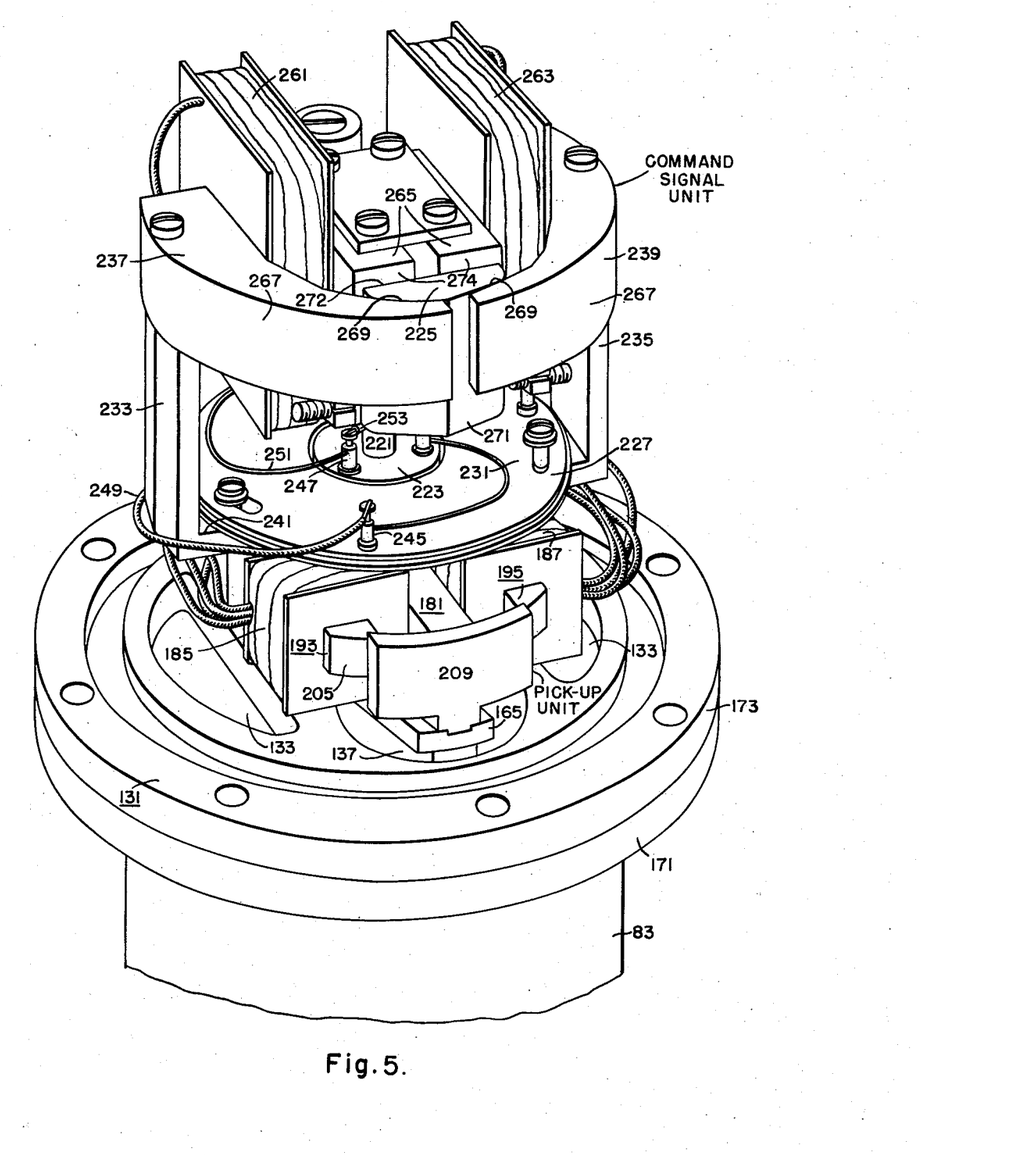
Fig. 5 is a view in perspective of a portion of the embodiment shown in Fig. 4.

The bearings 63 in which the wheel rotates are supported from bearing brackets 75 secured between lips 77 extending centrally from the bases 69 of the container 65. The gyro wheel is thus restrained so that it has a single precession axis 71 which is coaxial with the cylindrical wall 67 of the can. The can is filled with air or an inert gas at atmospheric pressure. The gyro preferably is a Westinghouse GEC gyro motor.

The cylindrical container or can 65 is coaxially supported within a circularly cylindrical shell or sleeve 81 which is, in turn, supported within a second circularly cylindrical shell 83 (Fig. 4). The latter shell is closed by a base consisting of a flanged rectangular plate 85 (Fig. 6) having an internal shoulder 87 engaged by the outer shell 83. The stem 89 of the plate 85 is closed by a cap 91 which is secured to the stem. The plate 85 and stem 89 have a central opening 93 which carries a plug 95 having a sealing ring 97 in a circumferential slot and having an opening 99 within which the fixed race 101 of ball bearing 103 is axially slidably disposed to accommodate temperature differential expansion.

The movable race 107 of the bearing 103 is secured to a three legged spider 109 (Fig. 6) secured to the inner shell 81. Two of the legs 111 and 113 carry lugs 115 and 117. The lower base 69 of the cam 65 carries cooperative lug 119 and the can 65 is suspended from the inner shell 81 by leaf springs 121 and 123 between the lugs 115, 117 and 119.

The outer shell 83 has a flanged base 131 (Fig. 13) at the top. The base has slotted openings 133 and 135 through which movable components connected to the pick-off signal units extend, a circular hole 137, and an opening 139 at the center.

The fixed race 141 of a ball bearing 143 which is coaxial with the bearing 103 is secured in the opening 139. Thus, in response to temperature differential expansion, bearing 103 may move axially relative to 143 and axial loading is not imposed. The movable race 145 of the bearing 143 is secured to a stem 146 of a spider 147 (Fig. 7) similar to the spider 109 and likewise provided with lugs 149 and 151 which are connected by leaf springs 153 and 155 to lugs 157 and 159 secured to the upper base of the can 65.

The inner shell 81 is thus supported coaxially within the outer shell 83 by the ball bearings 103 and 143, and the can 65 is supported coaxially within the inner shell 81 on leaf springs 121, 123, 153, 155 extending from lugs projecting from the bases of the container. The leaf springs 121 and 123 and 153 and 155 are crossed but do not engage. There is thus a resilient connection between the restrained gyro wheel and the inner shell 81 about the precession axis 71 of the gyro.

A yoke (Figs. 4 and 7) consisting of a pair of projections 161 and 163 secured to the top 69 of the gyro container 65 and a cross disk 165 secured to the projections 161 and 163 extends from the top of the can 65.

Figures 6, 7, 8, 9, 12, 13:
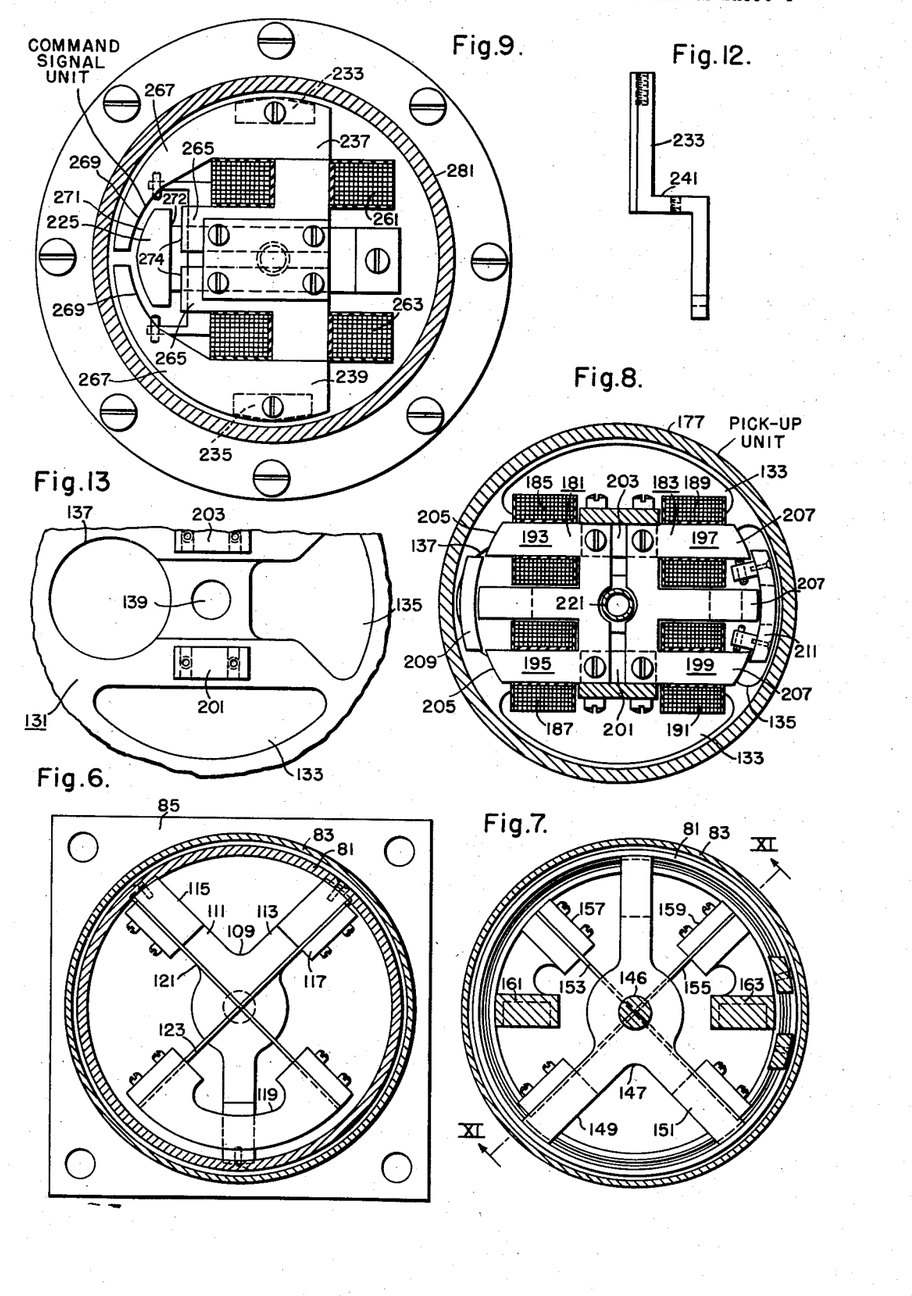
Fig. 6 is a view in transverse section taken along line VI—VI of Fig. 4.
Fig. 7 is a view in transverse section taken along line VII—VII of Fig. 4.
Fig. 8 is a view in transverse section taken along line VIII—VIII of Fig. 4.
Fig. 9 is a view in transverse section taken along line IX—IX of Fig. 4.
Fig. 12 is a view in side elevation of a bracket used in supporting a component of the command element in accordance with this invention.
Fig. 13 is a view in top plan of the top of the outer shell in the embodiment shown in Fig. 4.

The outer shell 83 is provided with a flange 171 and the flange 173 of the top 131 is bolted between the flange 171 and a flange 175 of a flanged cylindrical spacer 177 (Fig. 4). Within the spacer 177 a pair of pick-up units are provided (Fig. 8). Each unit is of the alternating current bridge type including a pair of E-shaped cores 181 and 183, each core having coils 185, 187, 189, 191 on its outer legs 193, 195, 197, 199. The cores 181 and 183 are supported from lugs 201 and 203 extending from the top 131. The pole ends 205 and 207 extending toward the periphery of the spacer 177 from each of the cores 181 and 183 are curved and cooperate with curved armature 209 and 211. One of the armatures 209 is secured to the yoke 161—163—165 extending from the can 65, the other 211 extends from a bifurcated curved bracket 213 secured to the inner shell 81. The former armature 209 is thus moved with the can 65 and the latter with shell 81. The curvature of the pole ends 205 and 207 and the cooperative armatures 209 and 211 is such that the movement of the armatures is coaxial with the precession axis 71 of the gyro wheel 61.

In accordance with the usual practice, the coils 185 and 187 and 189 and 191 are connected in alternating current bridge networks. In the standby condition of the apparatus the armatures 209 and 211 are in balanced position with reference to the poles 205 and 207. When a torque is exerted by the precession of the gyro wheel 61 the armatures are displaced, unbalancing the bridges and producing signals. The signal produced by the movement of the armature 209 secured to the container 65 is proportional to the angular velocity plus the angle of rotation of the system under control; the signal produced by the movement of the armature 211 secured to the shell 81 is proportional only to the angle of movement of the system under control. Both pick-up units are included in the apparatus shown in Figs. 4 through 13 because it is desirable that the apparatus have high flexibility. The system disclosed has facilities for producing signals proportional to the angular velocity plus the angular displacement, the angular displacement alone or the angular velocity alone. In the usual practice of this invention, the pick-up having the armature 211 connected to the shell 81 is omitted and the only pick-up used is the one having the armature 209 connected to the container 65.

A flanged hollow shaft 221 (Fig. 4) is centrally secured by bolts to the cross disk 165 of the yoke. This shaft carries an insulating collar 223 intermediate its ends and at its upper end carries the armature 225 of the command signal unit. The hollow shaft passes through a circular opening between the cores 181 and 183 of the pick-up signal units.

A disk 227 (Fig. 10) having an opening 229 in its center to correspond to the flanges 231 of the collar 223 is mounted so that it encircles the collar permitting the collar 223 to rotate relative thereto. The disk is held by knee brackets 233 and 235 (Fig. 12) extending along the inner wall of the spacer 177 and secured to the core parts 237 and 239 of the command signal unit. The disk is secured to the knees 241 of the brackets (Fig. 5) and is provided with a cap 243. The disk 227 and the collar 223 are both composed of insulating material each carrying a plurality of terminals 245 and 247 (Fig. 10). The supply conductors 249 for the gyro wheel 61 are connected to the terminals 245 on the disk 227 to the collar through flexible ribbons 251 preferably of silver, permitting rotation of the collar 223 relative to the disk 227 while imposing very low and constant restraint in the shaft 221. The terminals 247 are connected by conductors 253 of small dimensions which pass through openings 255 in the hollow shaft 221 and through seals (not shown) in the container 65 for the gyro wheel 61 and supply power to the gyro wheel.

The command signal includes, in addition to the pole piece 225 connected to the hollow shaft 221, a composite core including parts 237 and 239 and a plurality of coils 261 and 263. The parts 237 and 239 are held together by a plate to which they are bolted. Each part 237 and 239 includes an L-shaped portion 265 from which a portion 267 having the general shape of a bent finger extends. Each finger 267 constitutes a pole end of the core. Each finger 267 is tapered along the boundaries of its pole face 269. The armature 225 is also tapered along the boundaries of its pole face 271 and also along the boundaries of its pole face 272 opposite the pole faces 274 (with reference to the circle over which the armature moves). The armature moves between the ends of the L-shaped portions 265 and the faces 269 and is separated from each of these surfaces by a pair of gaps, one extending between the end of the L-shaped portions 265 and the face 272 and the other between the faces 269 and 271.

Because of the tapering of the boundaries of the pole faces 271, 269 and 272 of the armature 225 and the core 237—239 the air gap between the armature and the core changes at a very low rate as the armature 225 is rocked either in one direction or the other. Neglecting this change the torque produced by impressing current in either of the coils 261 or 263 varies as a function of the current parabolically, that is as the square of the current. This mode of variation is highly desirable in apparatus of the type under consideration. Where the displacement or the velocity of a turret, for example, is to be small, as during gun laying, it is desired that the precession torque impressed to produce the change be precise and this is achieved by the producing of a small torque for relatively large handle motion in this range. But such precise control is not required in the remainder of the control range so that the torque may increase rapidly as is necessary with the handle motion in the latter range. This object is accomplished in a simple manner by the pole structure just disclosed.

Figure 17:
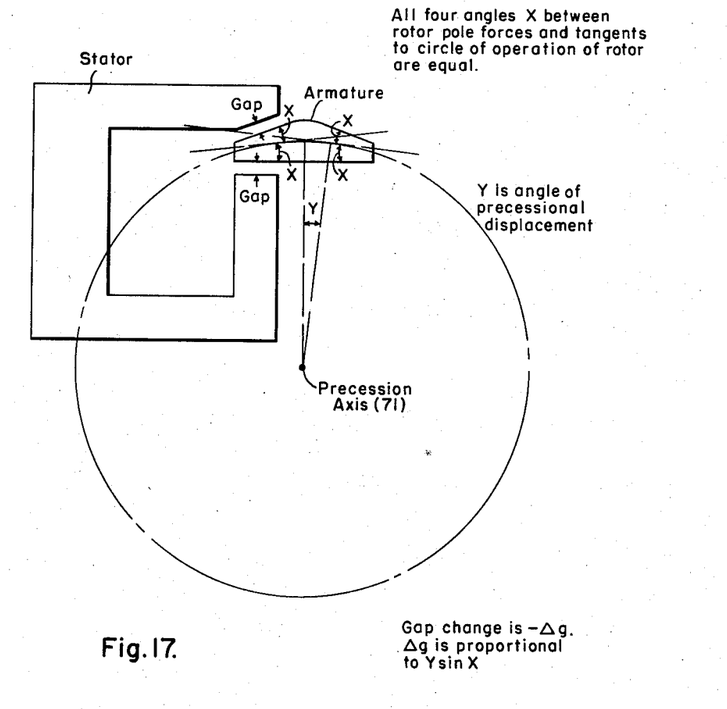
Fig. 17 is a diagrammatic view showing an aspect of this invention.

The functioning of the command signal unit (sometimes called torquer) is illustrated in Fig. 17, which is largely self explanatory. It is to be noted that the magnetic air gap changes as the product of the precessional angular displacement and the sine of the angle of taper (X). If the gap is required to change slowly, the angle of taper must be small, but within this limit, the angle of taper is made as large as practicable, to realize maximum torque.

The spacer 177 is covered by a flanged cap 281 which carries a fluid pressure relieving piston assembly 283 in its top 285 (Fig. 4). This assembly 283 includes a cylinder 287 having a stem 289 which may be screwed into the top 285. The stem has an opening through which fluid in the spacer 177 may communicate with the cylinder. Within the cylinder a piston 291 sealed by an O ring 293 is slidably mounted. The stem 295 for the piston extends through an opening in the top of the cylinder 287. A screw 297 is provided in the piston so that air may be bled from the system. The top 285 of the cap 281 is also provided with a suitably sealed jack 301 through which the connections for the various components are made.

The shell 83, spacer 177 and cap 281 are filled with fluid which is poured in through the cylinder 287. For this purpose the top of the cylinder 287 and the piston 291 are removed and the fluid is poured in the opening in the stem 289. Layers of fluid are thus provided between the outer shell 83 and the inner shell 81 and between the inner shell 81 and the wall 67 of the can 65. The wall 67 is spaced radially a substantially greater distance from the inner shell 81 than the inner shell is spaced from the outer shell. The fluid should preferably be of the viscosity required for the dimensional constants of the unit. The buoyancy of the can 67 in the fluid is such as to counteract the gravity effect of the can and gyro wheel on the suspensions of these components in the inner shell, and, what is more important, the buoyancy of the gyro container, the wheel and the inner shell is such as to counteract the gravity effect of these components on the ball bearings 103 and 143. It has been observed that with the buoyancy counteracting only a portion of the weight, the bearing friction is greatly reduced. The gyro unit may be mounted vertically or horizontally or at an angle to the vertical, depending on the purpose which it is to serve. Regardless of the mounting, the buoyance produced by the fluid medium on the container for the gyro wheel 61 and the sleeve 81 counteracts the gravity effect of these components on the bearings or on the springs. When the gyro unit is to be used in excessively cold climates, a heater may be provided for the fluid to eliminate any difficulties arising from low temperatures.

For a fluid, certain silicones, such as are used in the apparatus disclosed in an application Serial No. 499,598, filed April 6, 1955 to Robert S. Lackey and John Houtz, may be used and this application is incorporated herein by reference. Because of the shear of the fluid sections between the surfaces 67 and 81 and 81 and 83, the fluid exerts a damping force between these surfaces, the magnitude of which is proportional to the relative velocity of the surfaces. For any fluid, the magnitude of the damping force varies directly as the surface area of the fluid section in shear and inversely as the thickness of the section. The damping which produces the integration is high compared to the damping which suppresses mechanical resonance, and for this reason the spacing between the gyro wheel can wall 67 and the inner shell 81 is large compared to the spacing between the inner shell 81 and the outer shell 83 and the surface area of the latter fluid section is greater.

A gyro unit which has been built and found to operate satisfactorily has the following parameters:

Spin inertia of gyro wheel 61__________ $6.2 \times 10^{-4}$ lb.-in. seconds$^2$.
Precession inertia gyro wheel 61 and can 65. $1.55 \times 10^{-3}$ lb.-in. seconds$^2$.
Inertia-integration damping mechanism 81—83. $6.0 \times 10^{-3}$ lb.-in. seconds$^2$.
Spin velocity of gyro wheel 61______ $1.25 \times 10^3$ radians per second.
Sensitivity of pick-up unit 205_____ .003 radians over the full range.
Supporting spring 121—123; 153—155 stiffness constant (k). 5.2 lb.-in. per radian.
Damping constant of integration damping medium 81—83. 1.3 lb.-in. seconds per radian.
Damping of precession damping medium 67—81. .088 lb.-in. seconds per radian.

The above data is presented only for the purpose of aiding those skilled in the art in practicing this invention and not with any intent of restricting the scope of this invention. The parameters listed above were selected with the condition imposed that a constant input velocity of 20 mils (.020 radians) per second or an input displacement angle of 5 mils (.005 radians) should produce the full 3 mils pick-off displacement.

Standby—Figs. 4 through 13

In the standby condition of the apparatus, power is supplied to the gyro wheel 61 so that it is rotated. The bridges to which the coils 185, 187, 189 and 191 of the pick-up unit are connected are balanced and no current is supplied to the coils 261 and 263 of the command signal unit. Under these circumstances, the angular velocity of the gyro wheel about its precession axis 71 is zero and the pole pieces 209 and 211 and 225 of the pick-up units and the command signal units are in their balanced positions.

Operation—Figs. 4 through 13

The apparatus shown in Figs. 4 to 13 may operate responsive to a velocity of the movable system which is impressed externally or to a command signal. In the former circumstances the impressed velocity produces precession of the gyro, rotating the pole 209 of the pick-up unit which is attached to the gyro can 65 and unbalancing the bridge. The unbalance is proportional to the angular velocity plus the angular displacement. The unbalance signal is transmitted to an actuator which counteracts the motional error of the system. If desirable, an additional signal proportional to the displacement angle only can be transmitted from the other pick-up. When it is desirable to move the movable system the proper coil 261 or 263 of the command signal unit is energized, developing a precessional torque. This produces rotation of the gyro wheel 61 and its can 65 about the precession axis 71. The rotation unbalances the bridges to which the coils 185, 187, 189 and 191 of the pick-up units are connected and signals are transmitted which tend to produce a counteracting effect to the information impressed. The movable system is thus moved in a direction corresponding to the signal received by the coil of the command signal unit.

Figure 16

The apparatus shown in Fig. 16 is similar to that shown in Figs. 4 through 13 except that the inner shell or sleeve 351 is suspended by springs 353 and 355 from the outer shell 357 rather than by anti-friction bearings. Crossed springs similar to those of the embodiment shown in Figs.

4 and 13 may be used. In this case the torsional stiffness of the spring assembly 353—355 would be as low as practicable.

Conclusion

While preferred embodiments of this invention have been disclosed, many modifications thereof are feasible. Thus, an oscillation damping means could be included in the container for the gyro wheel as disclosed in Draper Reissue Patent 22,330. Under such circumstances, the inner shell or sleeve (81 or 351) could be omitted and the series damping be provided by fluid between the gyro wheel can and the outer shell (83 or 357). The invention, therefore, is not to be restricted except insofar as is necessitated by the spirit of the prior art.

I claim as my invention:

1. A gyroscopic unit comprising a gyro wheel, means restraining said wheel to precess about a single precession axis, a first shell having an axis of symmetry, a second shell having an axis of symmetry, resilient means suspending said wheel and said restraining means from said first shell with said precession axis coaxial with said axis of symmetry of said first shell, means suspending said first shell from second shell with said axis of symmetry of said first shell coaxial with said axis of symmetry of said second shell, and fluid means interposed between said first shell and said second shell.

2. A torque motor for impressing command signals on the gyro unit of gyroscopic control apparatus comprising a rotor having tapered pole ends bounding the pole faces, a stator having matching tapered pole ends bounding the pole faces, means mounting said rotor pivotally about an axis with its said pole faces facing the pole faces of said stator, and current responsive means for pivoting said rotor about said axis, the tapering of said boundaries being such that the air gap thickness between said pole faces changes at a low rate as a function of the angle of pivot of said rotor, whereby the torque available from said rotor also varies at a low rate with said angle of pivot.

3. A gyroscopic unit comprising a gyro wheel, means including a circularly cylindrical casing restraining said wheel to precess about a single precession axis, said casing being coaxial with said precession axis along the axis of its cylindrical surface, a first circularly cylindrical shell, a second circularly cylindrical shell, resilient means suspending said wheel and said restraining means from said first shell with said first shell coaxial with said precession axis along the axis of the cylindrical surface of said first shell, means suspending said first shell from said second shell with said second shell coaxial with said first shell along the axes of the cylindrical surfaces of said first and second shells, and fluid means interposed between said first shell and said second shell.

4. A gyroscopic unit comprising a gyro wheel, means restraining said wheel to precess about a single precession axis, a first shell having an axis of symmetry, a second shell having an axis of symmetry, resilient means suspending said wheel and said restraining means from said first shell with said precession axis coaxial with said axis of symmetry of said first shell, anti-friction bearing means suspending said first shell from said second shell with said axis of symmetry of said first shell coaxial with said axis of symmetry of said second shell, and fluid means interposed between said first shell and said second shell.

5. A gyroscopic unit comprising a gyro wheel, means restraining said wheel to precess about a single precession axis, a first shell having an axis of symmetry, a second shell having an axis of symmetry, resilient means suspending said wheel and said restraining means from said first shell with said precession axis coaxial with said axis of symmetry of said first shell, anti-friction bearing means suspending said first shell from said second shell with said axis of symmetry of said first shell coaxial with said axis of symmetry of said second shell, and fluid means interposed between said first shell and said second shell, the buoyancy of the restraining means and of the first shell in said fluid means counteracting the gravity effect of said wheel, said restraining means and said first shell on said anti-friction bearings.

6. A gyroscopic unit comprising a gyro wheel, means restraining said wheel to precess about a single precession axis, a first shell having an axis of symmetry, a second shell having an axis of symmetry, resilient means suspending said wheel and said restraining means from said first shell with said precession axis coaxial with said axis of symmetry of said first shell, resilient means mechanically connected to said first and second shells suspending said first shell from said second shell with said axis of symmetry of said first shell coaxial with said axis of symmetry of said second shell, and fluid means interposed between said first shell and said second shell.

7. A gyroscopic unit, comprising a gyro wheel, means restraining said wheel to precess about a single precession axis, and additional restraining means restraining said wheel about said precession axis, said additional restraining means including mechanically in series, resilient means and damping means, said gyro wheel, said restraining means and said additional restraining means including at least a first shell and a second shell, both said shells being circularly cylindrical with their axes coaxial with said precession axis, said resilient means extending between said gyro wheel and said first shell, said first shell being suspended from said second shell and said damping means including a fluid damping medium interposed between said first shell and said second shell.

8. A gyroscopic unit, comprising a gyro wheel, means restraining said wheel to precess about a single precession axis, and additional restraining means restraining said wheel about said precession axis, said additional restraining means including mechanically in series, resilient means and damping means, said gyro wheel, said restraining means and said additional restraining means including at least a first shell and a second shell, both said shells being circularly cylindrical with their axes coaxial with said precession axis, said resilient means extending between said gyro wheel and said first shell, suspending means for suspending said first shell from said second shell and said damping means including a fluid damping medium interposed between said first shell and said second shell, the buoyancy of said wheel and said first shell in the fluid medium counteracting the gravity effect of said wheel and said first shell on said suspending means for said first shell.

9. A gyroscopic unit, comprising a gyro wheel, means restraining said wheel to precess about a single precession axis, and additional restraining means restraining said wheel about said precession axis, said additional restraining means including mechanically in series, resilient means and damping means, said gyro wheel, said restraining means and said additional restraining means including at least a first shell and a second shell, both said shells being circularly cylindrical with their axes coaxial with said precession axis, said resilient means extending between said fiyro wheel and said first shell, said first shell being suspended from said second shell and said damping means including a fluid damping medium interposed between said first shell and said second shell, the spacing between said first shell and said second shell being small so that the damping of said fluid medium is high.

10. Control apparatus for a movable system comprising a gyro wheel, means restraining said wheel to precess about a single precession axis, resilient restraining means restraining said wheel about said precession axis; integrating means for integrating the precession response of said wheel to the velocity of said system, and an actuator connected to said wheel and said system and responsive to the precessional velocity response of said wheel and the integrated precessional velocity response of said wheel for controlling said system, the time constant of the portion of the apparatus including said wheel, said resilient restraining means and said integrating means being long compared to the time constant of the portion of the apparatus including said actuator and its cooperative parts in the movable system.

11. A torque motor for impressing command signals on the gyro unit of gyroscopic control apparatus comprising a rotor having tapered pole ends bounding the pole faces, a stator having matching tapered pole ends bounding the pole faces, means mounting said rotor pivotally about an axis with its said pole faces facing the pole faces of said stator, and current responsive means for pivoting said rotor about said axis, the tapering of said boundaries being such that the air gap thickness between said pole faces changes at a low rate as a function of the angle of pivot of said rotor, whereby the torque available from said rotor also varies at a low rate with said angle of pivot, the angle of taper of the pole ends of said rotor being so small that the magnetic air gap between the rotor and stator pole faces changes slowly with angle of pivot of the rotor and sufficiently large so that the required torque is developed.

12. Control apparatus for a movable system comprising a gyro wheel, means restraining said wheel to precess about a single precession axis, resilient restraining means restraining said wheel about said precession axis; integrating means for integrating the precession response of said wheel to the velocity of said system, and an actuator connected to said wheel and said system and responsive to the precessional velocity response of said wheel and the integrated precessional velocity response of said wheel for controlling said system, the damping constant of the integrating means being of the order of one pound-inch-seconds per radian.

13. A torque motor for impressing command signals on the gyro unit of gyroscopic control apparatus comprising a rotor having continuously tapered pole ends bounding the pole faces, a stator having matching tapered pole ends bounding the pole faces, means mounting said rotor pivotally about an axis with its said pole faces facing the pole faces of said stator, and current responsive means for pivoting said rotor about said axis, the tapering of said boundaries being such that the air gap thickness between said pole faces changes continuously at a low rate as a function of the angle of pivot of said rotor, whereby the torque available from said rotor also varies at a low rate with said angle of pivot.

References Cited in the file of this patent

UNITED STATES PATENTS

| | | |
|---|---|---|
| 1,900,709 | Henderson | Mar. 7, 1933 |
| 2,290,232 | Fischer | July 21, 1942 |
| 2,299,117 | Manteuffel | Oct. 20, 1942 |
| 2,484,022 | Esval | Oct. 11, 1949 |
| 2,581,476 | Fischer et al. | Jan. 8, 1952 |
| 2,709,921 | Sylvan | June 7, 1955 |
| 2,752,790 | Draper | July 3, 1956 |
| 2,766,627 | Lower et al. | Oct. 12, 1956 |
| 2,787,909 | Ruckstahl et al. | Apr. 9, 1957 |